(12) United States Patent
Kemp, II et al.

(10) Patent No.: US 8,204,822 B2
(45) Date of Patent: *Jun. 19, 2012

(54) METHOD AND INTERFACE FOR PRESENTING LAST TRADED QUANTITY INFORMATION

(75) Inventors: Gary Allan Kemp, II, Winnetka, IL (US); Joan Ebersole, Glen Ellyn, IL (US); Jens-Uwe Schluetter, Evanston, IL (US)

(73) Assignee: Trading Technologies International, Inc., Chicago, IL (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/114,704

(22) Filed: May 24, 2011

(65) Prior Publication Data

US 2011/0225083 A1 Sep. 15, 2011

Related U.S. Application Data

(63) Continuation of application No. 12/695,794, filed on Jan. 28, 2010, now Pat. No. 7,979,345, which is a continuation of application No. 12/046,137, filed on Mar. 11, 2008, now Pat. No. 7,680,727, which is a continuation of application No. 10/254,560, filed on Sep. 25, 2002, now Pat. No. 7,366,691.

(51) Int. Cl.
*G06Q 40/00* (2012.01)
(52) U.S. Cl. ........................................... 705/37; 705/35
(58) Field of Classification Search ............... 705/35–45
See application file for complete search history.

(56) References Cited

U.S. PATENT DOCUMENTS

| 4,674,044 | A | 6/1987 | Kalmus et al. |
|---|---|---|---|
| 4,750,135 | A | 6/1988 | Boilen |
| 4,903,201 | A | 2/1990 | Wagner |
| 5,038,284 | A | 8/1991 | Kramer |
| 5,077,665 | A | 12/1991 | Silverman et al. |
| 5,101,353 | A | 3/1992 | Lupien et al. |
| 5,136,501 | A | 8/1992 | Silverman et al. |
| 5,270,922 | A | 12/1993 | Higgins |
| 5,297,031 | A | 3/1994 | Gutterman et al. |
| 5,297,032 | A | 3/1994 | Trojan et al. |
| 5,689,651 | A | 11/1997 | Lozman |
| 5,774,877 | A | 6/1998 | Patterson, Jr. et al. |
| 5,793,301 | A | 8/1998 | Patterson, Jr. et al. |
| 5,797,002 | A | 8/1998 | Patterson, Jr. et al. |
| 5,845,266 | A | 12/1998 | Lupien et al. |
| 5,915,245 | A | 6/1999 | Patterson, Jr. et al. |
| 5,924,082 | A | 7/1999 | Silverman et al. |
| 5,924,083 | A | 7/1999 | Silverman et al. |

(Continued)

FOREIGN PATENT DOCUMENTS

EP 1067471 1/2001

(Continued)

OTHER PUBLICATIONS

USPTO Presentation, NASDAQ, Nov. 8, 2001.

(Continued)

*Primary Examiner* — Rajesh Khattar
(74) *Attorney, Agent, or Firm* — McDonnell Boehnen Hulbert & Berghoff LLP

(57) ABSTRACT

Trading software may receive trading information from an exchange. The trading software may use the trading information to compute an estimate of last traded total sweep quantity. The trading software may also display the last traded total sweep quantity on a trading screen.

27 Claims, 10 Drawing Sheets

| | 102 | 100 | 104 | 106 |
|---|---|---|---|---|
| | Bid | Price | Ask | LTQ |
| | | 100 | 9 | |
| | | 99 | 2 | 1/0/24 |
| | | 98 | | |
| | | 97 | | |
| | | 96 | | |
| | 8 | 95 | | |
| | 3 | 94 | | |
| | 4 | 93 | | |
| | 11 | 92 | | |
| | 27 | 91 | | |

U.S. PATENT DOCUMENTS

| | | |
|---|---|---|
| 5,946,667 A | 8/1999 | Tull, Jr. et al. |
| 5,963,923 A | 10/1999 | Garber |
| 5,974,393 A | 10/1999 | McCullough et al. |
| 6,012,046 A | 1/2000 | Lupien et al. |
| 6,014,643 A | 1/2000 | Minton |
| 6,035,287 A | 3/2000 | Stallaert et al. |
| 6,098,051 A | 8/2000 | Lupien et al. |
| 6,131,087 A | 10/2000 | Luke et al. |
| 6,134,535 A | 10/2000 | Belzberg |
| 6,195,647 B1 | 2/2001 | Martyn et al. |
| 6,272,474 B1 | 8/2001 | Garcia |
| 6,278,982 B1 | 8/2001 | Korhammer et al. |
| 6,282,521 B1 | 8/2001 | Howorka |
| 6,408,282 B1 | 6/2002 | Buist |
| 6,766,304 B2 | 7/2004 | Kemp, II et al. |
| 6,772,132 B1 | 8/2004 | Kemp, II et al. |
| 6,938,011 B1 | 8/2005 | Kemp, II et al. |
| 6,993,511 B2 | 1/2006 | Himmelstein |
| 7,124,110 B1 | 10/2006 | Kemp, II et al. |
| 7,127,424 B2 | 10/2006 | Kemp, II et al. |
| 7,181,424 B1 | 2/2007 | Ketchum et al. |
| 7,366,691 B1 | 4/2008 | Kemp, II et al. |
| 7,389,268 B1 | 6/2008 | Kemp, II et al. |
| 7,680,727 B2 | 3/2010 | Kemp, II et al. |
| 2002/0023038 A1 | 2/2002 | Fritsch et al. |
| 2002/0035534 A1 | 3/2002 | Buist et al. |
| 2002/0055899 A1 | 5/2002 | Williams |
| 2002/0059129 A1 | 5/2002 | Kemp et al. |
| 2002/0073017 A1 | 6/2002 | Robertson |
| 2002/0099644 A1 | 7/2002 | Kemp et al. |
| 2002/0120551 A1 | 8/2002 | Jones |
| 2002/0138401 A1 | 9/2002 | Allen et al. |
| 2002/0178104 A1 | 11/2002 | Hausman |
| 2003/0004852 A1 | 1/2003 | Burns |
| 2003/0004853 A1 | 1/2003 | Ram et al. |
| 2003/0009411 A1 | 1/2003 | Ram et al. |
| 2003/0023542 A1 | 1/2003 | Kemp et al. |
| 2004/0117292 A1 | 6/2004 | Brumfield et al. |

FOREIGN PATENT DOCUMENTS

| | | |
|---|---|---|
| WO | 91/14231 | 9/1991 |
| WO | 95/26005 | 9/1995 |
| WO | 98/49639 | 11/1998 |
| WO | 99/19821 | 4/1999 |
| WO | 99/30259 | 6/1999 |
| WO | 99/53424 | 10/1999 |
| WO | 00/52619 | 9/2000 |
| WO | 00/62187 A2 | 10/2000 |
| WO | 00/62187 A3 | 10/2000 |
| WO | 00/65510 | 11/2000 |
| WO | 01/16830 | 3/2001 |
| WO | 01/16852 A2 | 3/2001 |
| WO | 01/16852 C1 | 3/2001 |
| WO | 01/22315 A2 | 3/2001 |
| WO | 01/22315 A3 | 3/2001 |
| WO | 01/65403 | 9/2001 |
| WO | 01/88808 | 11/2001 |
| WO | 02/59815 | 1/2002 |
| WO | 02/15461 | 2/2002 |
| WO | 02/29686 | 4/2002 |
| WO | 02/48945 | 6/2002 |
| WO | 02/069226 | 9/2002 |
| WO | 02/079940 | 10/2002 |
| WO | 02/093325 | 11/2002 |
| WO | 03/090032 A2 | 10/2003 |
| WO | 03/090032 A3 | 10/2003 |

OTHER PUBLICATIONS

Kharouf, A Trading Room with a View, Futures, 27, 11—Nov. 1998.
www.tradingtechnologies.com/products/xtrade_full.html (viewed May 22, 2001) Jun. 9, 2000.

| Bid | Price | Ask | LTQ |
|---|---|---|---|
| | 100 | 9 | |
| | 99 | 2 | 1/24 |
| | 98 | | |
| | 97 | | |
| | 96 | | |
| 8 | 95 | | |
| 3 | 94 | | |
| 4 | 93 | | |
| 11 | 92 | | |
| 27 | 91 | | |

102 — Bid; 100 — Price; 104 — Ask; 106 — LTQ

FIG. 4

|  102 | 100 | 104 | 106 |
|---|---|---|---|
| Bid | Price | Ask | LTQ |
|  | 100 | 9 |  |
|  | 99 | 2 | 1 |
|  | 98 |  | 2 |
|  | 97 |  | 17 |
|  | 96 |  | 4 |
| 8 | 95 |  |  |
| 3 | 94 |  |  |
| 4 | 93 |  |  |
| 11 | 92 |  |  |
| 27 | 91 |  |  |

METHOD AND INTERFACE FOR PRESENTING LAST TRADED QUANTITY INFORMATION

CROSS REFERENCE TO RELATED APPLICATIONS

The present application is a continuation of U.S. application Ser. No. 12/695,794 filed on Jan. 28, 2010, now U.S. Pat. No. 7,979,345, which is a continuation of U.S. application Ser. No. 12/046,137, filed on Mar. 11, 2008, now U.S. Pat. No. 7,680,727, which is a continuation of U.S. application Ser. No. 10/254,560 filed Sep. 25, 2002, now U.S. Pat. No. 7,366,691, the contents of which are fully incorporated herein by reference.

FIELD OF THE INVENTION

The present invention relates generally to electronic trading. More specifically, it relates to a method and interface for processing and displaying trading information.

BACKGROUND

Many exchanges throughout the world now support electronic trading. Electronic trading has made it possible for an increasing number of people to actively participate in a market at any given time. The increase in the number of potential market participants has advantageously led to, among other things, a more competitive market and greater liquidity.

A trader can connect to an exchange, for example, using a client device, and the exchange can serve as a host. Once connected, software running on the client device allows the trader to log onto one or more exchanges and participate in one or more markets. Some clients run software that creates specialized interactive trading screens. In general, the trading screens enable traders to enter orders into the market, obtain market quotes, and monitor positions. The range and quality of features available varies according to the specific trading software.

One such feature often displayed to traders is the last traded quantity ("LTQ"), which is typically associated with a last traded price ("LTP"). The LTQ generally reflects the quantity of the last match performed by the exchange's matching engine, while the LTP generally reflects the price level of the match. When a trader enters an order, the trader generally specifies a price and a quantity for the order. The order can be, for example, a buy or a sell order. When filling the order, the matching engine matches the order against all or part of one or more other orders. For example, a buy order at a specified limit price may be matched with a corresponding sell. Of course, an order may be matched against several orders, either at one or multiple price points, and an order may be matched against portions of one or more orders.

One situation where an order may be matched at multiple prices points occurs when a trader sweeps the market. A trader can sweep the market by placing an order opposite from the inside market. The inside market generally refers to the highest current bid price and lowest current ask price. Thus, a buy order placed above the inside market can sweep the market. Similarly, a sell order placed below the inside market can sweep the market.

FIG. 1A is a trading screen showing an example of a market for a tradeable object. The trading screen includes a price column 100, which displays various price levels for the tradeable object. A bid column 102 displays a quantity of bids, which is an offer to buy, at corresponding price levels. An ask column 104 displays a quantity of asks, which is an offer to sell, at corresponding price levels. A LTQ column 106 displays the last traded quantity matched by the matching engine, and, as shown in FIG. 1A, it is depicted in conjunction with the corresponding LTP. As depicted in FIG. 1A, the inside market is 8 bid@95 and 4 ask@96.

To illustrate an order matching at several price points and the last traded quantity, consider an order to buy 22@98. A buy 22@98 is an order to buy a quantity of 22 at a price of 98. The matching engine then attempts to fill the order based on the current state of the market. As shown in FIG. 1A, the market currently offers 4 at 96, 17 at 97, and 2 at 98. The matching engine begins by filling the order at the most favorable ask price.

So, the buy 22@98 is filled under the matching engine by buying 4@96, buying 17@97, and buying 1@98. In this example, the matching engine took the one new order and matched it at several different price points. FIG. 1B is a trading screen illustrating a display of the market state after filling the order at multiple price points. As shown in FIG. 1B, after filling the buy 22@98 order, there are no more asks at the 96 or 97 prices levels. These matched with the buy order. Similarly, the ask quantity at the 98 level is decreased to one, because one ask at this level matched against the buy 22@98 order.

The LTQ column 106 includes an entry at the 98 price level. In filling the buy 22@98 order, the matching engine first matched a quantity of four offered at the 96 price level. Next, the matching engine matched seventeen at the 97 price level. Finally, the matching engine matched one at the 98 price level. As the matching engine last matched a quantity of one at the 98 price level, the LTQ column 106 displays a "1" at the 98 price level. Thus, the LTQ value is a partial fill quantity instead of a total fill quantity, which would be displayed only if the buy 22@98 order fully matched at a single price level.

While the market state depicted in FIG. 1B may occur due to a sweep order, it may also occur due to other market events. Thus, the transition from the market depicted in FIG. 1A to the market depicted in FIG. 1B may occur due to market changes other than a sweep order. For example, the traders having ask orders at the 96 and 97 prices levels may cancel their orders, and a single order may be matched at the 98 price level. The LTQ column 106 would then reflect a single order matched at the 98 price level, and the ask quantities at the 96 and 97 price levels would be removed to reflect the cancellations. Of course, other combinations of cancellations and orders may also cause the market to transition from the state depicted in FIG. 1A to the state depicted in FIG. 1B.

In two typical methods for providing updates to the trading software, an exchange may provide a separate update for each market change, or an exchange may provide updates at periodic intervals that indicate market changes during the preceding time period. These methods may then affect the display of the LTQ. For example, when an order sweeps the market, the trader would only see the LTQ value of the last match made by the matching engine. For an exchange the provides only periodic updates, the trader may not be able to judge how many orders matched at other price levels, because the periodic update would include the LTQ value for the last executed trade and not for all the preceding trades. Also, the trader may not be able to determine whether orders were cancelled at other price levels, or whether a combination of matches and cancellations occurred. For an exchange that provides updates for each market change, the trading software may display a series of LTQ values in quick succession. While the trading software may display each LTQ value, the values may be displayed so rapidly that the trader may miss viewing all of the matches, thereby causing the trader to misjudge the market conditions.

In the following detailed description, a trading method and interface for displaying last traded quantity information are described. These tools provide advantages, as described below, to a trader in an electronic trading environment.

BRIEF DESCRIPTION OF THE FIGURES

The presently preferred embodiments of the present invention are described herein with reference to the drawings, in which:

FIG. 4 is a preferred embodiment of the trading screen of FIG. 2 in which the last traded quantity includes a last traded quantity value for the last traded price and a last traded quantity total sweep quantity value;

FIG. 10 is a preferred embodiment of the trading screen of FIG. 2 in which multiple last traded quantities are displayed at multiple price levels with extended display times.

DETAILED DESCRIPTION

Figure 1A:
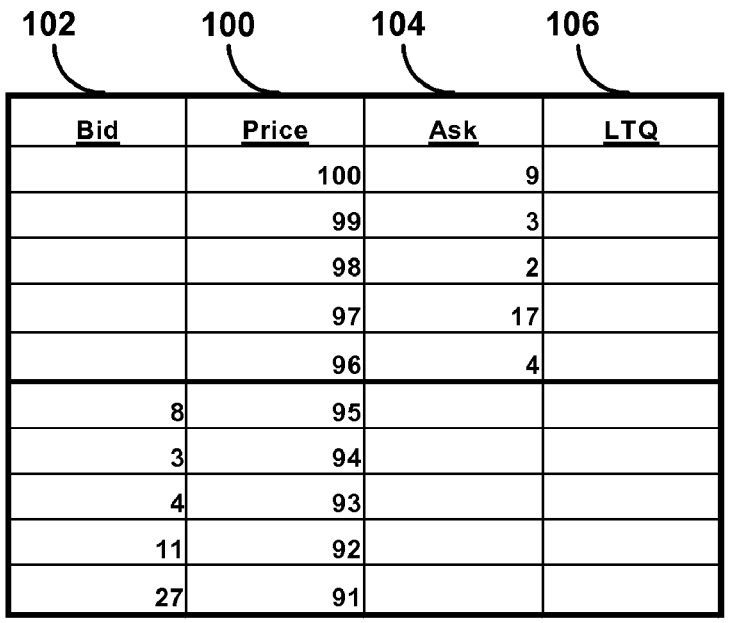
FIG. 1A is a trading screen showing an example of a market for a tradeable object.
Figure 1B:
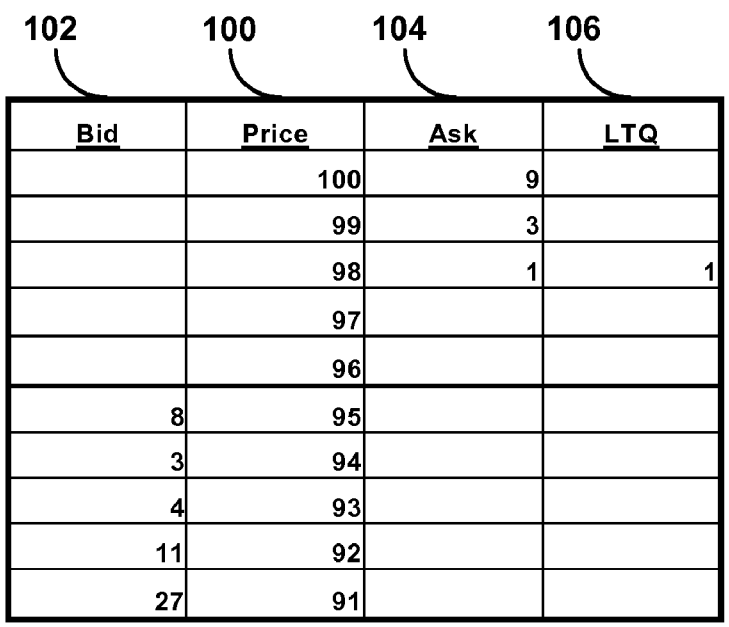
FIG. 1B is a trading screen illustrating a conventional display of a last traded quantity.

Many different exchanges support electronic trading. Electronic trading allows a trader to interact with the exchanges from a remote or non-remote location, such as by using a computer connected to the exchanges over one or more computer networks. Once connected to an exchange, the trader may receive market information about tradeable objects that are traded on the exchange. The trader may additionally trade the tradeable objects, such as by entering buy or sell orders.

A tradeable object can be any object, such as stocks, options, bonds, futures, currency, warrants, funds, or other financial objects. Other objects, for example, grains, energy and metals can also be traded. Of course, these lists are not exhaustive, and any other object for which there exists a market can be traded. Tradeable objects can be "real," such as products that are listed by an exchange for trading, or they can by "synthetic," such as a combination of real products that is created by a trader. Of course, a tradeable object could actually be a combination of other tradeable object, such as a class of tradeable objects.

Exchanges that support electronic trading are generally based on one or more hosts, one or more computer networks, and clients. In general, the host includes one or more centralized computers to form the electronic heart. Its operations may include order matching, maintaining order books and positions, price information, and managing and updating a database that records such information. The host may also be equipped with an external interface that maintains uninterrupted contact to the clients and possibly other trading-related systems.

Market participants may link to the host through one or more networks. A network is a group of two or more computers linked together. There are many types of networks such as local area networks and wide area networks. Networks can also be characterized by topology, protocol, and architecture. However, any type of network configuration can be used in electronic trading. For example, some market participants may link to the host through a direct connection such as a T1 line, an Integrated Digital Services Network ("ISDN") connection, a digital subscriber line ("DSL") connection, a cable connection, an analog phone line or another type of connection. When connecting through a direct connection, a market participant may connect through one or more common network components such as high-speed servers, routers, and gateways, and so on. Of course, a market participant may also connect to the exchange through the Internet or another type of network.

A method, system and interface for electronic trading with an exchange is described in U.S. Pat. No. 6,772,132, and is also described in U.S. Pat. No. 6,938,011. Both patents are commonly assigned to Trading Technologies International, Inc., and the contents of both patents are incorporated herein by reference. Moreover, the trading application may implement tools for trading tradeable objects that are described in a U.S. Pat. No. 7,389,268 which is commonly assigned to Trading Technologies International, Inc., and the contents of which are incorporated herein by reference. These applications describe network topologies, interfaces and general trading functionality and techniques that may be used in implementing the preferred embodiments described herein.

Trading screens may enable traders to enter and cancel orders, obtain market information, and monitor positions while implementing various trading strategies including those previously used on the floor of an exchange. For example, using the trading screen a trader may receive information about tradeable objects traded on the exchange. Additionally, the trader may use the trading screen, for example, to place buy and sell orders for the tradeable objects or to otherwise trade the tradeable objects.

Once connected to the exchange, the trading software may receive information from the exchange, which can in turn be displayed to the trader. For example, the trading software may receive a list of tradeable objects traded on the exchange. Additionally, the trading software may receive market information for each tradeable object, such as bid prices, bid quantities, ask prices, ask quantities, and additionally, some exchanges provides prices and quantities for past sales, and other market related information. The information may continuously or regularly provided to the trading software, which allows the trading software to update the trading screen with current market information.

After the trading software receives this information from the exchange, the trading software may format and display the information. One piece of information that is often displayed by trading software is the last traded quantity ("LTQ"). The LTQ generally refers to the quantity of the last match performed by the exchange's matching engine. The LTQ may also be associated with a last traded price ("LTP"), which represents the price level at which the LTQ was matched.

When a trader places an order, the matching engine may fill the order by matching it against all or part of one or more outstanding orders. For example, a buy order may be matched against one or more sell orders. Similarly, a sell order may be matched against one or more buy orders. For an order that is matched against one other order, the LTQ generally indicates the total quantity of the order. When an order matches at more than one price level, however, the LTQ generally indicates only the quantity matched at the last price level.

As previously described, this type of LTQ display can have several disadvantages. For example, the trader may be unable to differentiate an order that filled at multiple price levels from an order than filled at one price level with order cancellations at the other price levels. In another example, the trader may be unable to adequately view LTQ values displayed in quick succession. When LTQ values are displayed in quick succession, all the LTQ values may be displayed but they may be displayed so quickly that the trader may be unable to discern all the displayed values. Thus, while the trader could then view the last LTQ value, the trader may be unable to track the market's movement in the preceding period due to the rapidly changing display of LTQ values.

Instead of simply displaying the LTQ value of the last match performed by the exchange's matching engine, the trading software in one preferred embodiment is modified to display an estimated LTQ total sweep quantity. Thus, while the preferred embodiments may describe an LTQ total sweep quantity displayed by the trading software, it should be understood that the LTQ total sweep quantity may be an estimated value. The LTQ total sweep quantity, which may also sometimes be referred to as the last traded total sweep quantity, may represent a total number of objects matched at different price levels, such as the total number of objects traded in a market sweep. By displaying the total sweep quantity, a trader can view the total number of objects that matched across the various price levels instead of just viewing the quantity that most recently matched at a single price level. Thus, the trader may more easily discern that a sweep did occur and may more easily discern the movement of the market, for example by distinguishing between orders that filled and orders that were cancelled.

Figure 2:
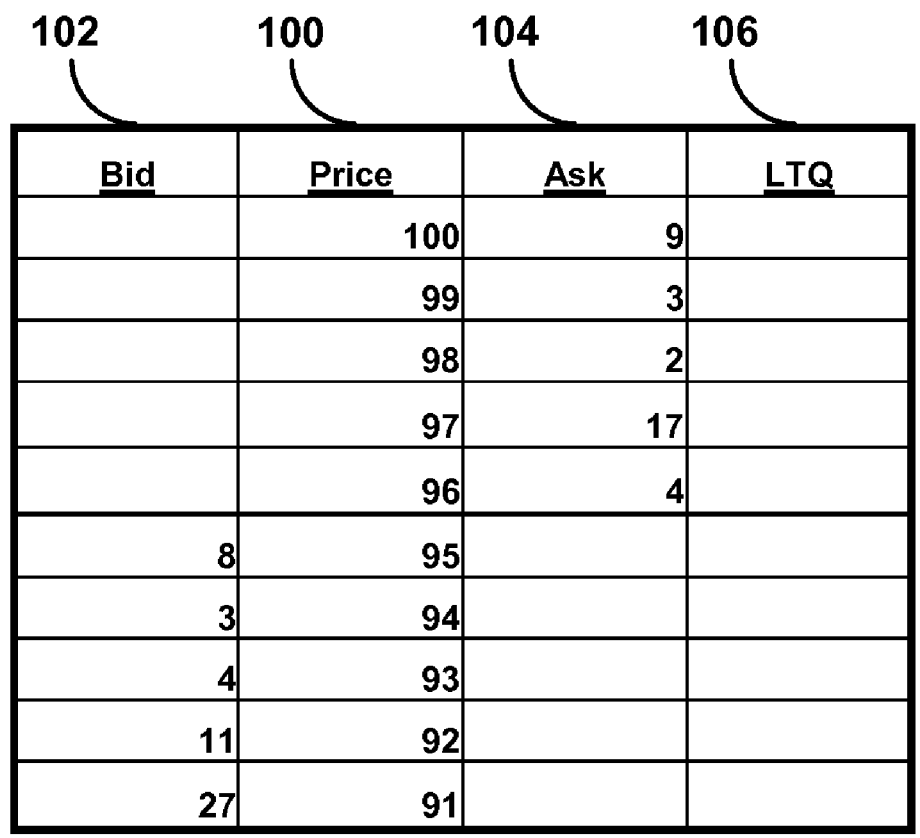
FIG. 2 is a preferred embodiment of a trading screen for displaying a last traded quantity.

FIG. 2 is a preferred embodiment of a trading screen, such as may be used to display an LTQ total sweep quantity. A trading screen used to display LTQ total sweep quantities, such as the trading screen in FIG. 2, may generally include a variety of different regions that may be used to display other market information in addition to the LTQ total sweep quantity. As shown in FIG. 2, the trading screen includes four columns. The price column 100 displays various different price levels for a tradeable object. The bid column 102 displays bid quantities at various different price levels. The ask column 104 displays ask quantities at various different price levels.

The LTQ column 106 may display a last traded quantity. Instead of displaying only the last quantity matched at a particular price level by the exchange's matching engine, the LTQ column 106, in one embodiment, displays the last traded quantity total sweep quantity. Thus, the LTQ column 106 can display a single LTQ total sweep quantity value representing multiple matches, such as for an order that fills at multiple price levels or when multiple orders fill.

FIG. 2 depicts the trading screen in an example of a market for a tradeable object. The bid column 102 displays the quantities bid at various different price levels, and the ask column 104 displays quantities offered at various different price levels. Of course, the particular values are one example of the market at a particular instant in time, and they may vary due to changing market conditions. It should also be understood that the trading screen depicted in FIG. 2 is merely an example and that the principles discussed herein for determining and displaying LTQ total sweep quantities can be used with any type of trading display. For example, the columns may be displayed in different orders. A greater or fewer number of columns can be displayed.

As a further alternative, the information may be presented in a row format rather that columns, or the grid may be eliminated entirely and the information presented graphically. As one example of an alternative, the information may be presented in a row display. For example, the row display may be a static price display in which the row includes a price, a bid quantity, an ask quantity and an LTQ value, and the display may include multiple rows corresponding to multiple price levels. Further, alternate embodiments may remove the price column 100 from the display, or they may remove or add other information. The preferred embodiments are not limited to two-dimensional displays, but rather any number of dimensions that illustrates the relationship between the LTQ and a particular price level may be used. It should also be understood that the preferred embodiments are not limited to interfaces that display market information in numerical form. Graphical representations may alternatively be used. Various other modifications may also be made.

Figure 3:
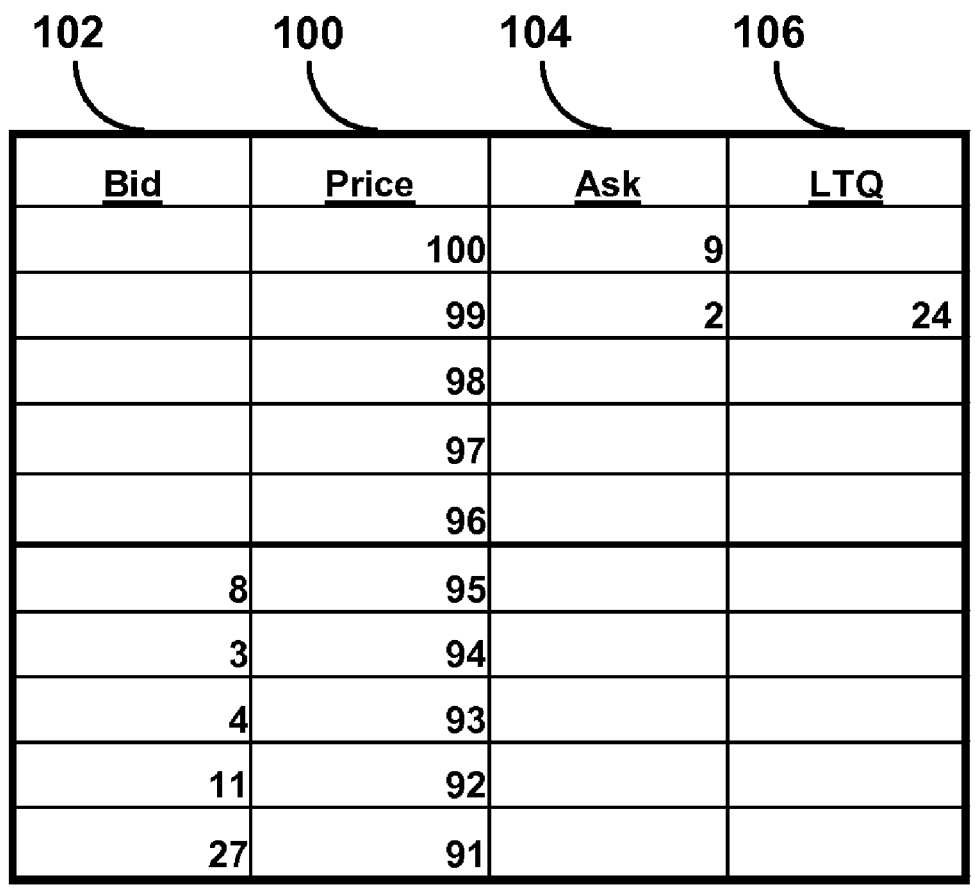
FIG. 3 is a preferred embodiment of the trading screen of FIG. 2 in which the last traded quantity represents a total sweep quantity value.

FIG. 3 is a preferred embodiment of the trading screen of FIG. 2 in which the last traded quantity represents a total sweep quantity value. FIG. 3 shows a new state of the trading screen after a sweep of the market. Thus, the market state depicted in FIG. 2 transitions to the market state depicted in FIG. 3 based on the execution of an order that sweeps the market and is filled at multiple price levels.

For example, the exchange's matching engine can process a buy order for 24@99. In order to fill this order, the matching engine can match it against sell orders at multiple price levels. Starting with the market state depicted in FIG. 2, the matching engine begins matching the order against the most favorable ask prices. Thus, the matching engine first matches a quantity of four at the 96 price level. This leaves a remaining quantity of twenty to be filled.

Since the matching engine exhausted the ask quantity at the 96 price level, it next moves to the 97 price level. At the 97 price level, a quantity of seventeen is available, so the matching engine matches an additional seventeen at this price level. A quantity of two is available at the 98 price level, so the matching engine next matches two at that price level. This leaves one to be matched. The matching engine next matches one at the 99 price level in order to complete the order.

While the last quantity matched by the matching engine was one at the 99 price level, the value displayed in the LTQ column 106 at the 99 price level may reflect the LTQ total sweep quantity instead of the last traded quantity at that level provided by the exchange. Thus, instead of displaying a "1," as would be the case for a value that simply reflected the last traded quantity, a value of "24" is displayed. The LTQ total sweep quantity value of 24 displayed in the LTQ column 106 at the 99 price level allows the trader to see that in fact 24 objects matched. The trader can readily discern that the market moved due to filled orders instead of order cancellations. Many different modifications can be made to the display in the LTQ column 106, for example, to provide the trader with additional information or to present the illustrated information in a different way.

FIG. 4 is a second preferred embodiment of the trading screen of FIG. 2 in which the last traded quantity includes a last traded quantity value for the last traded price and a last traded quantity total sweep quantity value. While the display of FIG. 3 allows the trader to see the LTQ total sweep quantity, it does not indicate the last traded quantity at the last price level matched by the matching engine. Thus, using the display of FIG. 3, the trader can tell that the last order matched at the 99 price level, because that is the level where the LTQ total sweep quantity value is displayed, but the trader cannot tell the number of objects that matched at that level.

As shown in FIG. 4, the value displayed in the LTQ column 106 is modified to reflect both a LTQ total sweep quantity and a last traded quantity at that price level. The trading screen may illustrate this information, for example, by displaying a "1/24" instead of simply displaying the "24" that was depicted in FIG. 3. The "1" indicates the last traded quantity at the 99 price level, while the "24" represents the LTQ total sweep quantity. Of course, the "1/24" format is merely an example, and other numerical and/or graphical formats may alternatively be used. For example, the order of the values may be switched, the display format may be different, and/or additional information may be displayed.

Figure 5:
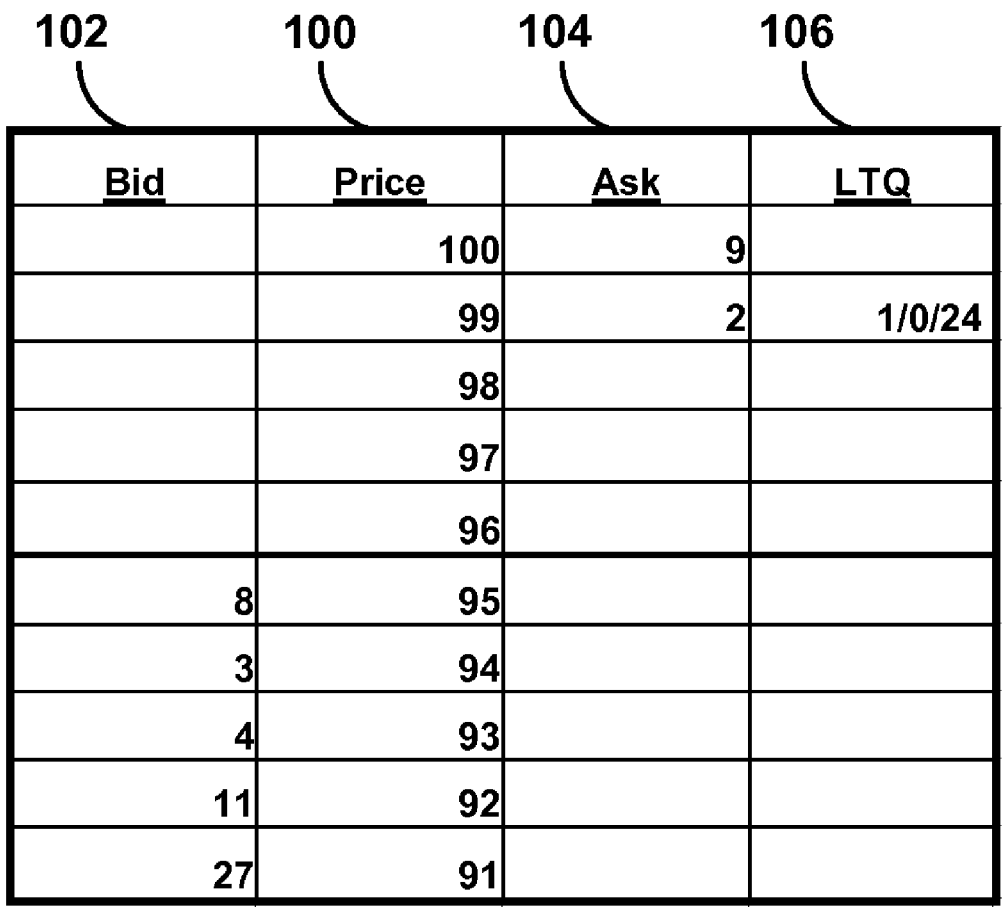
FIG. 5 is a preferred embodiment of the trading screen of FIG. 2 in which the last traded quantity includes a last traded quantity value for the last traded price, a deleted quantity value, and a last traded quantity total sweep quantity value.

FIG. 5 is another preferred embodiment of the trading screen of FIG. 2 in which the last traded quantity includes a last traded quantity value for the last traded price, a deleted quantity value, and a last traded quantity total sweep quantity value. In the example shown in FIG. 5, the LTQ column 106 displays "1/0/24" instead of just displaying "24," which was illustrated in FIG. 3. As described for FIG. 4, the "1" indicates the last traded quantity at the 99 prices level, and the "24" indicates the total sweep quantity. In addition to these displays, FIG. 5 also displays a "0." The "0" indicates a deleted quantity value, which in this case was zero because the resting orders below 99 were swept rather than being canceled or deleted. However, if some of the orders below 99 were deleted, then a non-zero LTQ total sweep quantity and a non-zero deleted order quantity may be generated. Of course, various modifications may be made to the display. For example, the order of the values may be changed, a different display format, such as a graphical indication, may be used, and/or additional information may be displayed.

Exchanges generally provide market updates using a variety of different methods, and this may have an effect on calculating and displaying the LTQ total sweep quantity. In the one method, the exchange provides periodic updates of market information to connected client devices. Thus, the exchange can provide updates to its client devices at predetermined intervals, and each update can reflect the changes in the market that occurred during the predetermined interval. Exchanges such as Eurex provide updates using this method. In a second method, the exchange provides an update each time the market changes. Exchanges such as the London International Financial Futures and Options Exchange ("LIFFE"), the Chicago Mercantile Exchange ("CME") and Island ECN provide updates using this method.

An exchange can provide updates, for example, by sending data structures to its client devices. The data structures may be sent through intermediate devices, such as gateways, and the intermediate devices may reformat the data structures before ultimately providing them to the client devices. Generally each client device receives a single data structure that includes different market information, such as the last traded quantity, the total traded quantity ("TTQ"), the last traded price, the bid/ask amounts at each price level, the market depth and other information. Alternatively, this information can be provided to a client device using more than one data structure. Each exchange may use a different type of data structure and may provide different information. For an exchange that provides continual updates, a data structure can be transmitted each time the market changes, such as when a trade is executed. For an exchange that provides updates at predetermined intervals, the data structure can be provided to the client devices at the predetermined intervals with no data structures sent that reflect intervening market changes.

While the predetermined intervals can be set and varied by the exchange, the exchange may provide the market updates, for example, every 1-2 seconds. Of course, this interval is merely an example, and an exchange may use a longer or shorter interval. By providing information at intervals, the exchange can reduce the bandwidth used to transmit the data structures to its client devices. Thus, for a heavier market usage, the exchange may provide the market updates more infrequently in order to conserve bandwidth. For fewer users or a lighter market volume, the exchange may decide to provide the market updates more frequently. These predetermined intervals may vary based on the particular exchange, and they may be dynamically altered by the exchange during a connection with the exchange.

The trading screens depicted in FIGS. 3-5 may be used with an exchange that provides periodic updates to its client devices or with an exchange that provides updates each time the market changes. When connecting to an exchange that uses periodic updates, a client device can receive periodic updates and trading software on the client device can estimate the LTQ total sweep quantity based on the periodic updates. Since exchanges generally only provide the LTQ of the last match, such as in the data structure sent to the client device, the client device would ordinarily not directly receive the LTQ total sweep quantity. The trading software may perform its own estimate of the LTQ total sweep quantity, for example, by comparing the TTQ in one update with the TTQ quantity in the previous update. The difference in the TTQ values (i.e., the current TTQ value minus the previous TTQ value) may be used as the estimate of the LTQ total sweep quantity, which would then be displayed in the LTQ column 106.

Figure 6:
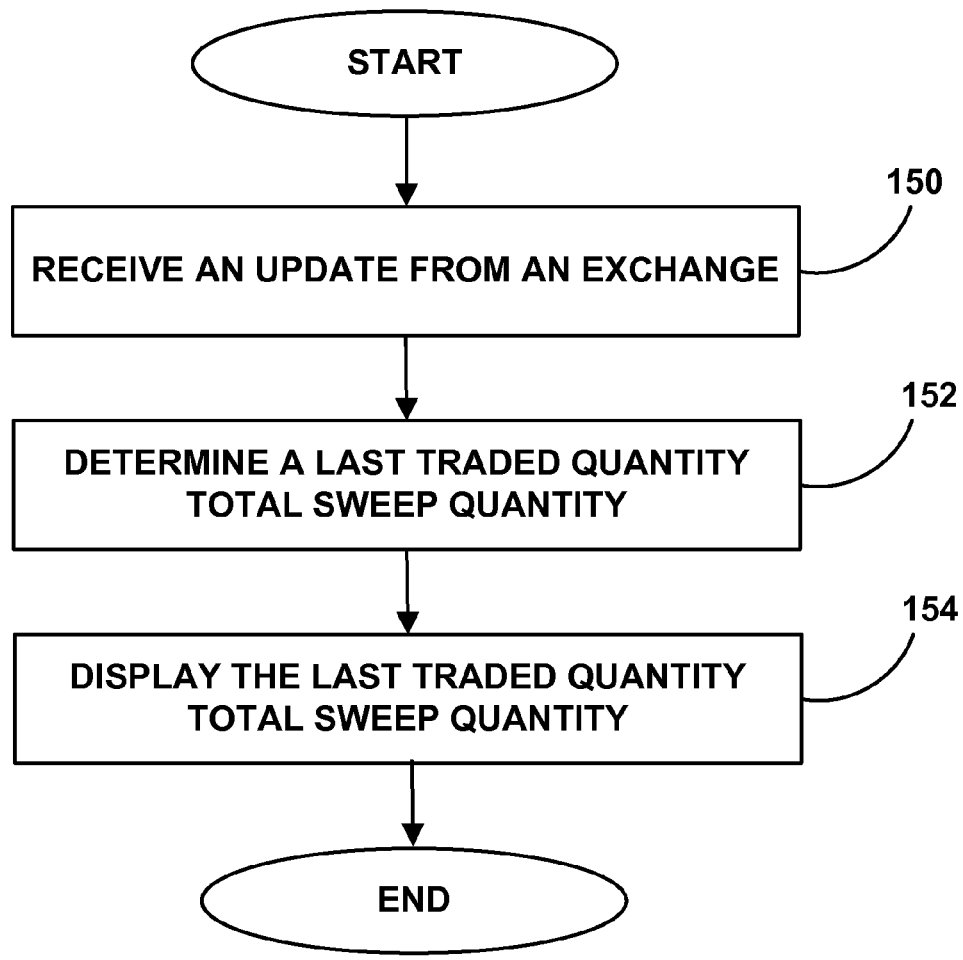
FIG. 6 is a flowchart of a preferred process for determining and displaying last traded quantity total sweep quantity values.

FIG. 6 is a flowchart of a preferred process for determining and displaying last traded quantity total sweep quantity values, such as may be used when connecting to an exchange that provides periodic updates. The process can be used, for example, to compute and display last traded quantity total sweep quantity values in the displays described in FIGS. 3-5. At Step 150, the trading software receives an update from an exchange. At Step 152, the trading software determines a last traded quantity total sweep quantity. Then, at Step 154, the trading software displays the last traded quantity total sweep quantity.

Figure 7:
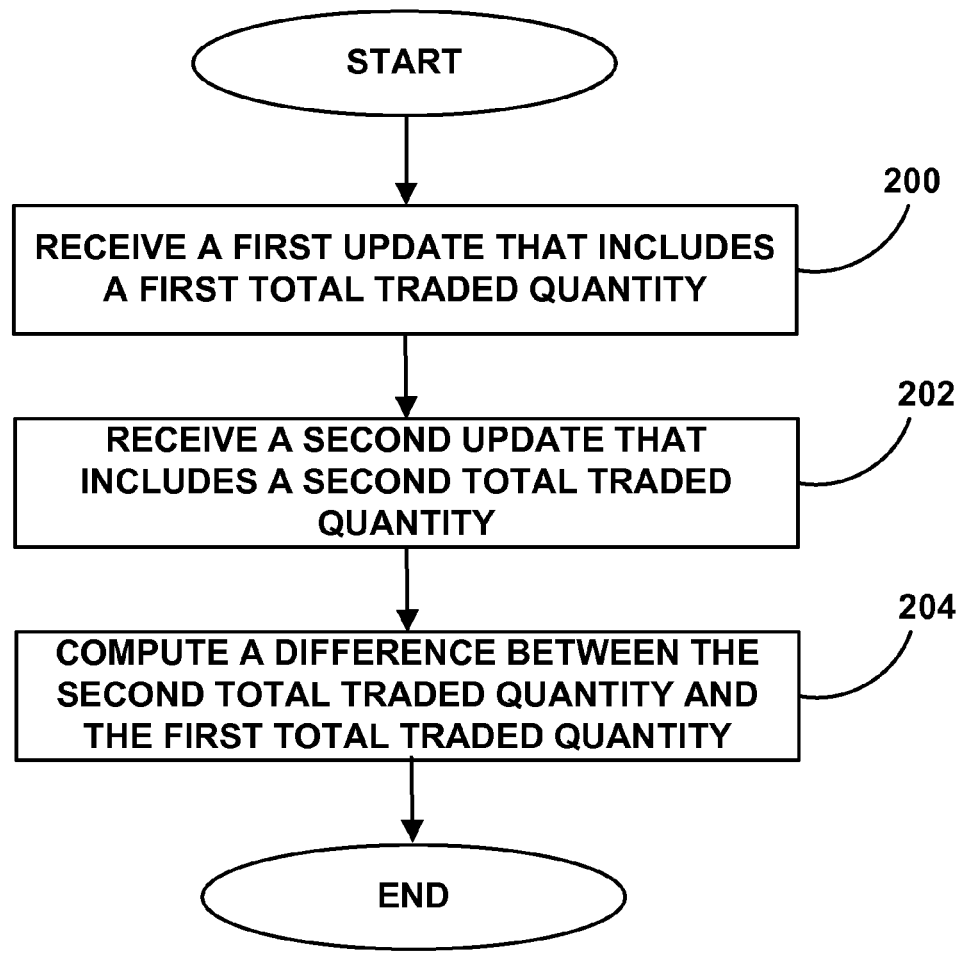
FIG. 7 is a flowchart of a preferred process for determining a last traded quantity total sweep quantity.

FIG. 7 is a flowchart of a preferred process for determining an LTQ total sweep quantity, such as may be used when connecting to an exchange that provides periodic updates. It may also be used, however, when connecting to an exchange that provides updates for each market change. The process can be used, for example, as Step 152 of FIG. 6. With reference to FIG. 7, at Step 200, the trading software receives a first update that includes a first total traded quantity. At Step 202, the trading software receives a second update that includes a second total traded quantity. Then, the trading software computes a last traded quantity total sweep quantity by computing a difference between the second total traded quantity and the first total traded quantity, as shown at Step 204.

Of course, the trading software may determine that a sweep has occurred in a variety of different ways. For example, the trading software may determine that a sweep has occurred when the inside market moves one or more price levels away from the inside market level indicated by the previous update. In another example, the trading software may track the movement of the inside market over multiple updates, thereby allowing a sweep to occur over multiple updates. However, where the inside market remains at the same price level as one or more previous updates, then the trading software may determine that a sweep has not occurred and may not display an LTQ total sweep quantity. In one alternate embodiment, if the trading software determines that a sweep has not occurred, the trading software may still display the change in total traded quantity thereby allowing a trader to view the number of orders that executed between updates.

Figure 8:
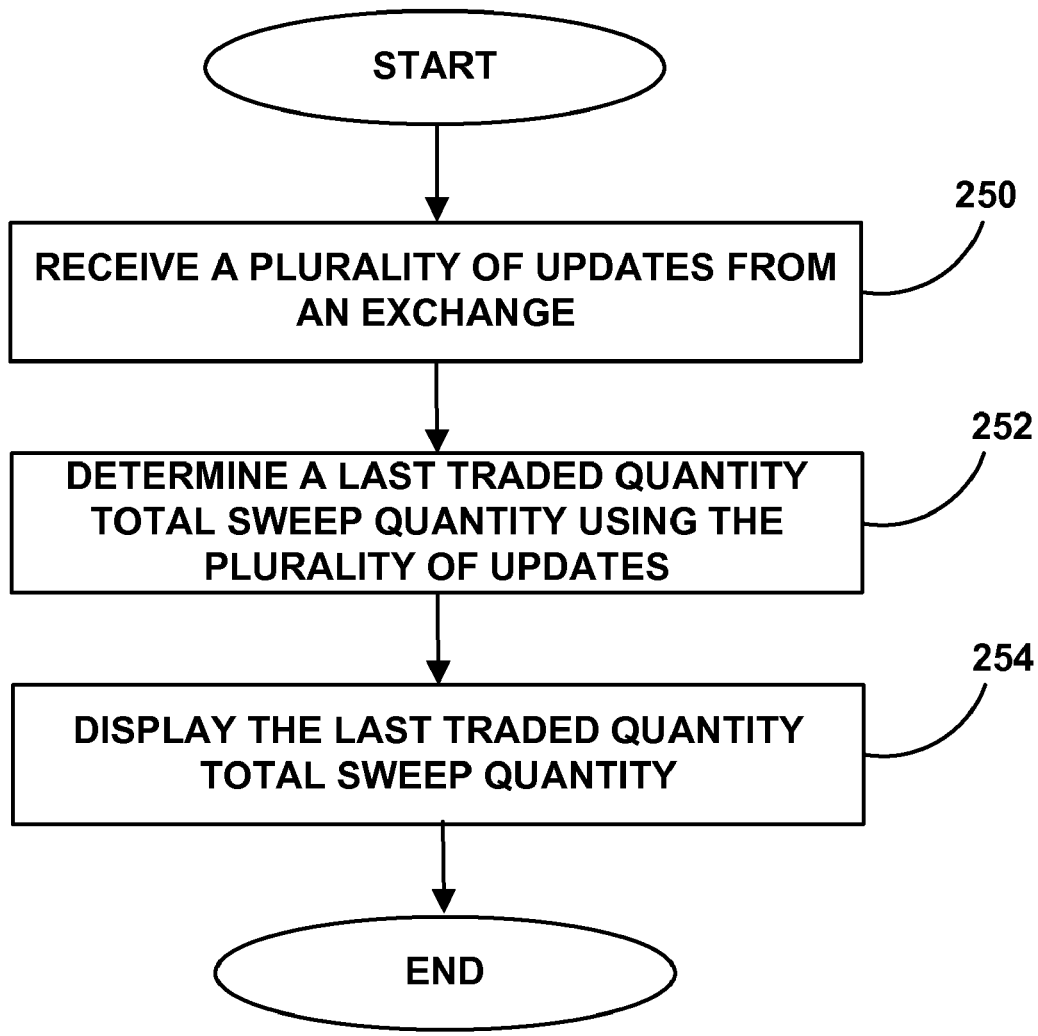
FIG. 8 is a flowchart of a preferred process for determining and displaying last traded quantity total sweep quantity values.

FIG. 8 is a flowchart of a preferred process for determining and displaying last traded quantity total sweep quantity values, such as may be used when connecting to an exchange that provides updates for each market change. At Step 250, the trading software receives a plurality of updates from an exchange. Each update may reflect a change in the market, such as a trade, an order cancellation or some other change. At Step 252, the trading software determines a last traded quantity total sweep quantity using the plurality of updates. Then, at Step 254, the trading software displays the last traded quantity total sweep quantity.

Figure 9:
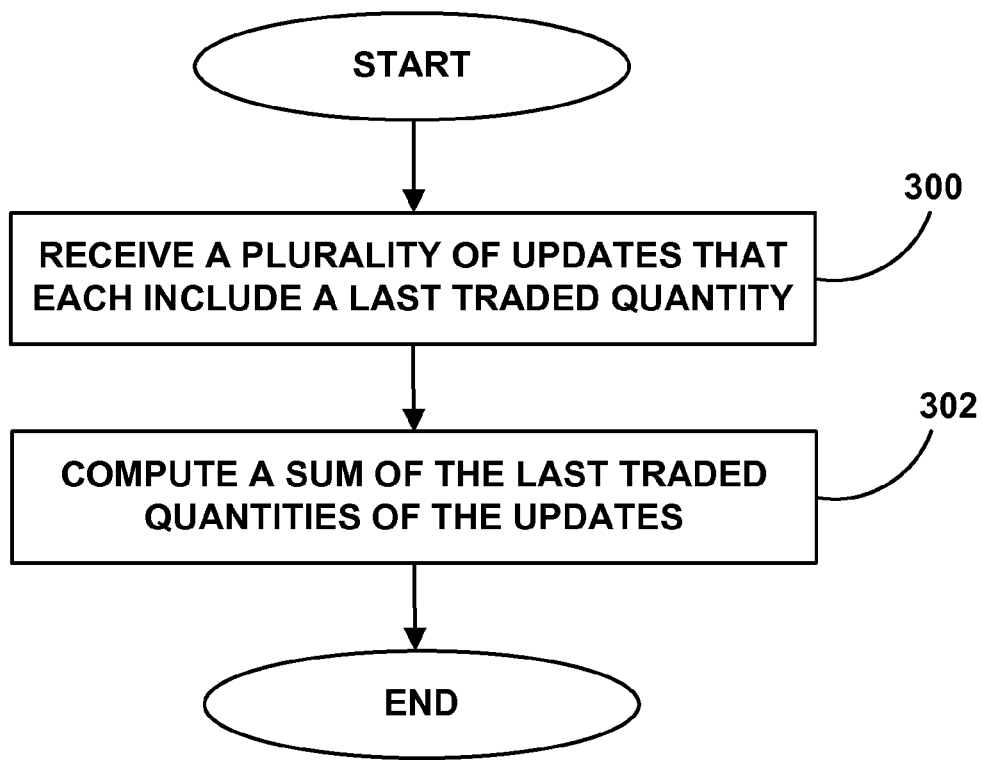
FIG. 9 is a flowchart of a preferred process for computing a last traded quantity total sweep quantity.

FIG. 9 is a flowchart of a preferred process for computing a last traded quantity total sweep quantity, such as may be used when connecting to an exchange that provides updates for each market change. The process can be used, for example, as Step 252 of FIG. 8. With reference to FIG. 9, at Step 300, the trading software receives a plurality of updates that each includes a last traded quantity. Then, the trading software computes a sum of the last traded quantities of the updates, as shown at Step 302. The sum may then represent the last traded quantity total sweep quantity.

For an exchange that provides updates each time the market changes, the trading software would receive an update for each market change. Thus, for each match, it would receive an update that includes an LTQ value for that match. The LTQ total sweep quantity may then be computed by summing the LTQ values. Of course, as part of estimating the LTQ total sweep quantity, the trading software may first determine when a sweep has occurred and therefore which LTQ values to sum. In one preferred embodiment, the trading software could sum LTQ values when it detects the inside market moving past one or more price levels in a predetermined period of time. Thus, the trading software may buffer the LTQ values, and after detecting a sweep, may then sum the values in order to estimate the LTQ total sweep quantity. If the inside market remained at the same level over a predetermined period of time, for example, then the trading software may determine that a sweep had not occurred and thus would not continually sum the LTQ values in order to estimate and LTQ sweep quantity. Of course, may other modifications may be made to determine when a sweep occurs, and these may also be used.

For an exchange that provides periodic updates, one periodic update may include updated market information as a result of several different market events, but it would only include one LTQ for the most recent match performed by the exchange's matching engine. Thus, the trading software would not receive an LTQ for each match and would not then be able to compute the LTQ total sweep quantity by simply summing the received LTQ values.

Similarly, there may be differences in computing deleted order quantities depending on how the exchange provides updates. For an exchange that provide updates each time the market changes, the trading software may receive an update for each deleted order. While the exchange may explicitly provide a deleted order quantity, the trading software may alternatively estimate a deleted order quantity by receiving an update that includes a decreased outstanding order quantity at a price level without a corresponding increase in the total traded quantity. The trading software may then compute track the total deleted order quantities simply by using the deleted order quantity information in the updates. This can be done, for example, by summing the individual deleted order updates.

For an exchange that receives periodic updates, the trading software may compute the deleted order quantity differently. For example, the trading software may store a first state of the market, such as can be indicated by a first update. The trading software may then receive a second update, which may indicate a second state of the market. As previously described, the trading software may determine the number of orders matched by finding the difference between the TTQ value of the second market state and the TTQ value of the first market state. The trading software can then estimate the number of deleted orders by determining a difference between the number of outstanding orders in the second market state and the number of outstanding orders in the first market state. This difference, adjusted for the number of orders matched by the exchange, can provide an estimate of the number of deleted orders. Of course, other factors, such as deleted orders coupled with added orders, may cause inaccuracies in the estimation of the deleted order quantity.

When connecting to an exchange that provides market updates at predetermined intervals, the LTQ value displayed in the LTQ column 106 would generally also be updated at the predetermined interval. For a large enough interval, such as on the order of a few tenths of a second, the trader would ordinarily be able to see the LTQ value updates and discern the movement of the market. However, when the exchange provides updates each time the market changes, the trading software may update the LTQ values before the trader has an opportunity to view and visually process the information. Thus, the trader may entirely miss viewing LTQ value updates, or the trader may view the LTQ values updates so rapidly that the trader is unable discern the market movement from the updates.

Figure 10:
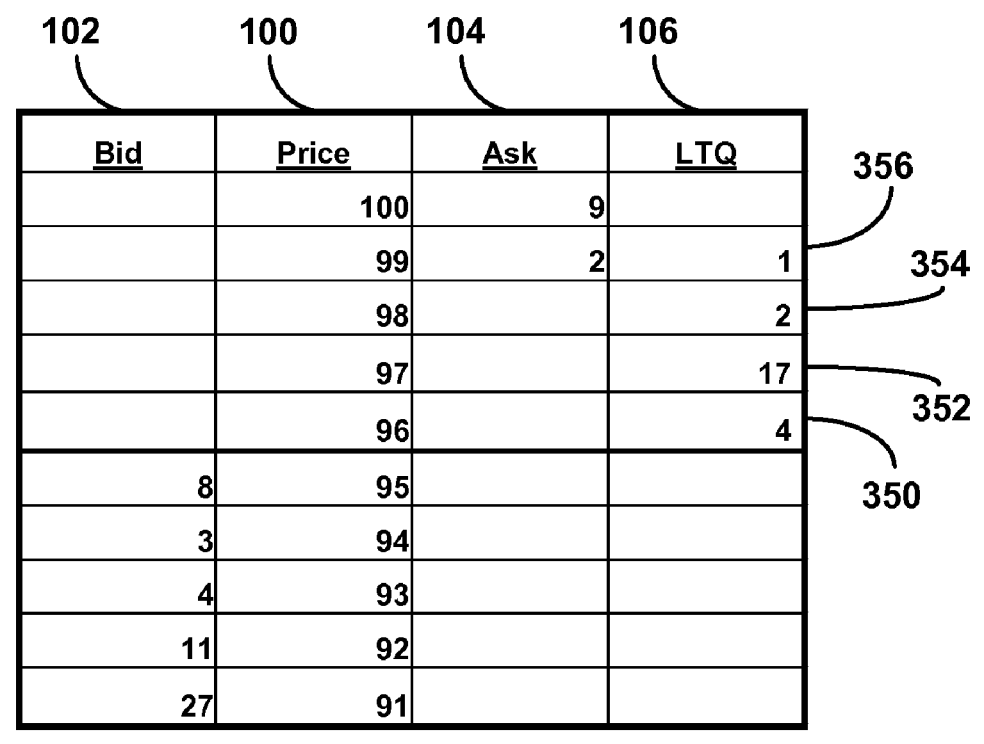

In order to aid the trader when connecting to a market that provides updates for each market change, the trading software may display multiple LTQ updates, or it can alter the length for which an LTQ update is displayed. FIG. 10 is another preferred embodiment of the trading screen of FIG. 2 in which multiple last traded quantities are displayed at multiple price levels with extended display times. This trading screen can be used, for example, when connecting to an exchange that provides updates each time the market changes. Of course, it may also be used when connecting to an exchange that provides periodic updates.

As shown in FIG. 10, the LTQ column 106 displays multiple LTQ values. These values can correspond to multiple LTQ matches, thus indicating an LTQ total sweep quantity instead of just the last match performed by the exchange's matching engine. As the matching engine attempts to fill an order for 24@98, which was previously described with reference to FIG. 3, the matching engine first fills 4 at the 96 price level. In response, the exchange would generate an update to send to the client devices. The trading software running on a client device would receive the update and then extract the LTQ quantity of 4. Next, the trading software displays the LTQ quantity of 4 at the 96 price level, which is depicted in FIG. 10 as Block 350.

Next, the matching engine would match 17@97. An update would be sent to the trading software, which would extract the LTQ quantity of 17. Instead of removing the 4 at the 96 price level and displaying 17 at the 97 price level, as would occur in a conventional system, the trading software in this embodiment displays the 17 LTQ quantity at the 97 price level in addition to the 4 LTQ quantity displayed at the 96 price level. In FIG. 10, the 17 LTQ quantity is displayed at Block 352. Similarly, the 2 LTQ quantity would displayed at the 98 price level and the 1 LTQ quantity would be displayed at the 99 price levels. These would be displayed at Blocks 354 and 356 respectively. The LTQ quantities at the 98 and 99 price levels may be displayed in addition to the LTQ quantities at the 96 and 97 price levels. Displaying the LTQ values in this manner can advantageously allow the trader to see the four matches for this order instead of simply seeing a partial fill quantity of 1 at the 99 price level. The trader would be able to tell that orders filled at all four price levels instead of having cancellations at these levels.

In order to prevent the LTQ column 106 from becoming cluttered with numerous LTQ values, each LTQ value may be displayed for a predetermined period of time. The trading software can specify the predetermined period of time, such as by setting a default value. The trader may then alter the value, such as by changing the default value specified by the trading software. Of course, it is also possible that the trading software specifies the predetermined amount of time and that the amount of time cannot be altered by the trader, or the time period may be set initially by the trader.

In a preferred operation, the first LTQ update value would be displayed in Box 350. Once the LTQ update value is display in Box 350, the trading software would continue to display the LTQ update value for the predetermined period of time. A subsequent update, such as the one next displayed in Box 352, would also be displayed for the predetermined period of time. Similarly, the displays in Boxes 354 and 356 would also be displayed for the predetermined period of time. Thus, subsequent updates would not replace previous updates, and the trader would be able to view each LTQ update for the predetermined period of time regardless of whether the trading software received subsequent LTQ updates.

As the predetermined periods of time expire, the LTQ update values would be removed from the trading screen. As Box 350 was the first update, it would be removed first as its predetermined amount of time expired. Next, after its predetermined amount of time expired, the LTQ update value in Box 352 would be removed. Similarly, the LTQ update value in Box 354 would be removed after its predetermined amount of time expired, and then the update in Box 356 would be removed after its predetermined amount of time expired.

In a preferred embodiment, the LTQ update values displayed in the LTQ column 106 fade-out over the predetermined amount of time. For example, the display intensity of an LTQ update value may be greatest when it is initially displayed. As the predetermined period of time progresses the intensity of the display can decrease, thereby causing the LTQ update value to fade-out. Fading-out the LTQ update values may allow the trader to more easily distinguish more recent LTQ update values from older LTQ update values. Of course, it is also possible that the LTQ update values do not fade-out but are simply removed after the predetermined amount of time. As an alternative, color shading of the LTQ column 106 boxes may be used to indicate aging. For example, the color of the displayed LTQ values may change over time to represent aging.

In another preferred embodiment for displaying LTQ total sweep quantity values, the trading software can receive multiple updates from an exchange. However, instead of updating the trading screen for each update received from the exchange, the trading software may update the trading screen more infrequently. For example, the trading software may use two or more updates to perform a single update of the trading screen. This technique can be advantageously used when connecting to exchanges that provide an update for each market change, thereby slowing down the rate at which the trading screen is updated and allowing a trader to more easily see changes in the market. Of course, this technique may also be used with exchanges that provide periodic updates.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. A trading device comprising:
   an output device having an electronic processor and configured to display at least:
   a columnar order display region configured to display indicators for orders for a tradeable object according to market information for the tradeable object received from an electronic exchange, and
   a columnar estimated last traded total sweep quantity region configured to display an estimated last traded total sweep quantity representing a number of trades executed over a plurality of price levels, the estimated last traded total sweep quantity determined according to the market information.

2. The trading device of claim 1 where the indicators represent a quantity of the tradeable object available for trading at a price.

3. The trading device of claim 2 where the indicators further comprise:
   buy order indicators representing a buy quantity available for the tradeable object and being displayed in a buy region of the columnar order display region; and
   sell order indicators representing a sell quantity available for the tradeable object and being displayed in a sell region of the columnar order display region.

4. The trading device of claim 1 further comprising an axis of prices aligned with the columnar order display region.

5. The trading device of claim 4 where the axis of prices comprises a static axis of prices.

6. The trading device of claim 4 where the axis of prices comprises the plurality of price levels.

7. The trading device of claim 6 where the plurality of price levels is derived from the market information.

8. The trading device of claim 7 where a quantity associated with orders to buy the tradeable object, a quantity associated with orders to sell the tradeable object, and the estimated last traded total sweep quantity for the tradeable object, are displayed relative to at least one corresponding price level of the plurality of price levels.

9. A method of displaying market information, the method comprising:
  displaying, via a trading device having an electronic processor, a columnar order display region;
  displaying, via the trading device, an order indicator for at least one order for a tradeable object relative to the columnar order display region according to market information for the tradeable object from an electronic exchange; and
  displaying, via the trading device, a quantity indicator for an estimate of a last traded total sweep quantity representing a number of trades executed over a plurality of price levels, the estimated last traded total sweep quantity determined according to the market information.

10. The method of claim 9 where the quantity indicator is displayed relative to the columnar order display region.

11. The method of claim 9 where the order indicator comprises a bid indicator.

12. The method of claim 9 where the order indicator comprises an ask indicator.

13. The method of claim 9 further comprising displaying an axis of prices aligned with the columnar order display region.

14. The method of claim 13 where the axis of prices comprises a static axis of prices.

15. The method of claim 14 where the order indicator and the quantity indicator dynamically change relative to the static axis of prices according to the market information.

16. The method of claim 14 where the axis of prices comprises the plurality of price levels.

17. The method of claim 16 where the plurality of price levels is derived from the market information.

18. The method of claim 9, further comprising displaying an order entry region for receiving a user command to initiate submission of an order for the tradeable object.

19. A non-transitory computer readable medium having instructions stored thereon which when executed cause a processor to execute acts comprising:
  displaying a columnar order display region;
  displaying an order indicator for at least one order for a tradeable object relative to the columnar order display region according to market information for the tradeable object from an electronic exchange; and
  displaying a quantity indicator for an estimate of a last traded total sweep quantity representing a number of trades executed over a plurality of price levels, the estimated last traded total sweep quantity determined according to the market information.

20. The non-transitory computer readable medium of claim 19, where the order indicator represents a quantity of the tradeable object available for trading at a price.

21. The non-transitory computer readable medium of claim 19 where the order indicator further comprises any of the following:
  a buy order indicator representing a buy quantity available for the tradeable object and being displayed in a buy region of the columnar order display region; and
  a sell order indicator representing a sell quantity available for the tradeable object and being displayed in a sell region of the columnar order display region.

22. The non-transitory computer readable medium of claim 19 where the acts further comprise displaying an axis of prices aligned with the columnar order display region.

23. The non-transitory computer readable medium of claim 22 where the axis of prices comprises a static axis of prices.

24. The non-transitory computer readable medium of claim 22 where the axis of prices comprises the plurality of price levels.

25. The non-transitory computer readable medium of claim 24 where the plurality of price levels is derived from the market information.

26. The non-transitory computer readable medium of claim 25 where the acts further comprise:
  displaying a quantity associated with orders to buy the tradeable object relative to at least one corresponding buy price level of the plurality of price levels;
  displaying a quantity associated with orders to sell the tradeable object relative to at least one corresponding sell price level of the plurality of price level; and
  displaying the estimated last traded total sweep quantity for the tradeable object relative to at least one corresponding estimated quantity price level of the plurality of price levels.

27. The non-transitory computer readable medium of claim 19, where the acts further comprise displaying an order entry region for receiving a user command to initiate submission of an order for the tradeable object.

* * * * *